(12) United States Patent
Choi

(10) Patent No.: US 7,215,381 B2
(45) Date of Patent: May 8, 2007

(54) IMAGE DISPLAY DEVICE IN DIGITAL TV

(75) Inventor: Seung Jong Choi, Seoul (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 11/374,112

(22) Filed: Mar. 14, 2006

(65) Prior Publication Data

US 2006/0158552 A1 Jul. 20, 2006

Related U.S. Application Data

(62) Division of application No. 09/922,863, filed on Aug. 7, 2001, now Pat. No. 7,079,193.

(30) Foreign Application Priority Data

Aug. 8, 2000 (KR) ............................... 2000-45807

(51) Int. Cl.
H04N 5/445 (2006.01)
(52) U.S. Cl. ...................................... 348/569; 382/248
(58) Field of Classification Search ........ 348/564–569, 348/390, 398, 421–425; 382/248
See application file for complete search history.

(56) References Cited

U.S. PATENT DOCUMENTS

| 5,604,824 | A | * | 2/1997 | Chui et al. ................... 382/248 |
| 5,732,202 | A | * | 3/1998 | Okamoto .................... 358/1.18 |
| 5,841,473 | A | * | 11/1998 | Chui et al. ................ 348/390.1 |
| 5,844,541 | A | * | 12/1998 | Cahill, III ................... 345/667 |
| 5,862,412 | A | * | 1/1999 | Sugiyama .................... 710/68 |
| 5,969,770 | A | * | 10/1999 | Horton ........................ 348/569 |
| 6,157,396 | A | * | 12/2000 | Margulis et al. ............ 345/506 |
| 6,256,068 | B1 | * | 7/2001 | Takada et al. .............. 348/441 |
| 6,275,267 | B1 | * | 8/2001 | Kobayashi .................. 348/555 |
| 6,373,527 | B1 | * | 4/2002 | Lee ............................. 348/564 |
| 6,456,340 | B1 | * | 9/2002 | Margulis .................... 348/745 |
| 6,529,244 | B1 | * | 3/2003 | Hrusecky .................... 348/453 |
| 6,788,347 | B1 | * | 9/2004 | Kim et al. ................... 348/441 |
| 6,853,385 | B1 | * | 2/2005 | MacInnis et al. ........... 345/629 |

* cited by examiner

Primary Examiner—Paulos Natnael
(74) Attorney, Agent, or Firm—Birch, Stewart, Kolasch & Birch, LLP

(57) ABSTRACT

Disclosed is an image display device in a digital TV that is capable of carrying out the conversion into various kinds of resolution by using single bit map data in the digital TV. The image display device includes: a data processing part for executing bit map conversion, compression, restoration and format-conversion for text data; a memory for storing the bit map data obtained according to the bit map conversion and compression in the data processing part and image data inputted from an arbitrary receiving part, the receiving part receiving one of digital image data and analog image data; an image outputting part for reading the image data from the memory; and a display processing part for mixing the image data read from the image outputting part and the bit map data converted in format from the data processing part. Therefore, the image display device according to the present invention can convert text data in such a manner as to correspond with various resolution, carry out the compression for bit map data, thereby reducing the memory space, and support text data of an HTML format, thereby providing the image with the text data of various shapes.

14 Claims, 2 Drawing Sheets

IMAGE DISPLAY DEVICE IN DIGITAL TV

This application is a Divisional of application Ser. No. 09/922,863, filed on Aug. 7, 2001 now U.S. Pat. No. 7,079,193, the entire contents of which are hereby incorporated by reference and for which priority is claimed under 35 U.S.C. § 120.

BACKGROUND OF THE INVENTION

1. Field of the Invention

The present invention relates to an image display device, and more particularly, to an image display device in a digital TV that is capable of converting into various kinds of resolution by using single bit map data in the digital TV.

2. Background of the Related Art

Due to a rapid development of information communication, many people believe that a digital revolution is taking place. As the technologies on electricity, electron, computer and communication are being rapidly developed, the pattern in storing the information on image, audio and multimedia made by the collection of information of various shapes has been changed from an analog pattern to a digital pattern.

Particularly, with the development of an MPEG (Moving Picture Experts Group) technology as a compression standard for moving picture data requiring a relatively large amount of data, the digital image data is gradually being decreased in size.

The MPEG technology is applied in the fields such as computers, broadcasting, electric appliances, communication and the like, thereby providing digital video and audio service. So as to provide such the digital video and audio service, digital equipment is proposed.

Among the digital equipments, a TV is one of the important media for easily and effectively providing information in everyday life.

Based upon such the digital technology, a digital TV compresses video data and audio data with the MPEG technology and transmits the resulting data, such that a great amount of information data can be provided in faster and stable manners. Thereby, the digital TV can have a large number of broadcasting channels that provide an improved quality of image and sound to a user.

Therefore, the digital TV can increase data capacity by 4 to 8 times when compared with the existing analogy TV, thereby allowing more services covering various fields such as sports, movie, home shopping, music and so on.

At present, the digital TV has provided the image service covering cable broadcasting, video on demand (VOD) and the like, in addition to public waves.

Also, a TV viewer selects a desired service in accordance with his own preference, thereby enjoying a free channel selection. Moreover, the viewer can select his desired broadcasting from numerous channels provided on the digital TV.

As noted above, the digital TV has various additional functions for the purpose of fulfilling various preferences of the viewers and thus providing much convenience to them.

In case of an output device of a setop box for a digital TV, generally, when predetermined information is provided to a user or when set contents and functions of the TV are changed, that is, when the set contents such as input set, display set, audio set, etc. are changed, the output device adopts a changing method using an on-screen display (OSD) where the set contents to be changed are displayed on the screen of TV.

Moreover, the image display device is applicable to data broadcasting in the digital TV.

The data broadcasting is carried out with texts that are contained in broadcasting data and thus transmitted, for the purpose of embodying various kinds of additional images.

For example, the data broadcasting outputs daily program order with the image during broadcasting or outputs an additional explanation on the image being broadcast.

FIG. 1 illustrates a conventional image display device in a digital TV.

As shown, the image display device is comprised of a memory 101 in which image data and text data are stored, an image outputting part 102 for reading the image data from the memory 101, and a display processing part 103 for reading the text data from the memory 101 and mixing the image data and the text data.

The image display device further includes an analog/digital converter 104 for converting analog image data into digital image data.

In operation, the conventionally developed image display device in the digital TV receives each of the text data and image data of an arbitrary digital broadcasting such as public wave broadcasting, cable broadcasting and video on demand at the digital TV, decodes the text data and the image data, respectively and stores the decoded data in the memory 101.

Before storing in the memory 101, at this time, each of the text data and the image data may be converted into bit map data.

Thereby, the image outputting part 102 reads the image data from the memory 101.

The display processing part 103 mixes the text data read from the memory 101 and the image data and outputs the mixed result on a predetermined display screen.

When predetermined information is provided to a user, when set contents and functions of the TV are changed or when various images are provided with the text data, of course, the display processing part 103 mixes the text data (i.e., bit map data) read from the memory 101 and the image data (i.e., bit map data) and outputs the mixed result on the predetermined display screen. On the other hand, when the text data is not provided, the display processing part 103 outputs only the image data on the screen.

Also, the digital TV may receive analog broadcasting, in addition to the digital broadcasting.

That is to say, the digital TV receives analog image data of the analog broadcasting, converts the analog image data into digital image data through the analog/digital converter 104, and decodes the converted digital image data. Then, it stores the decoded result to the memory 101 and after that, executes the same process as the digital broadcasting.

On the other hand, the digital TV can handle the image having various frame rates in interlace and progressive scanning of 24 Hz, 30 Hz, 60 Hz and so on and display various images having resolution of 720×480, 854×480, 1280×720 and 1920×1080.

To provide the various resolution as mentioned above, the image data and the text data should be convertible according to variation of the resolution.

However, the above-mentioned conventional image display device can convert the image data into display format according to the variation of resolution and display it, but it does not have any function of converting the text data into the display format according to the variation of resolution. So, the conventional device should store the text data for each resolution in bit map data format and read the bit map data stored according to each resolution, thereby displaying the resulting data on the screen.

An example of various resolution in the digital TV is given by the following Table.

| Display Resolution | Bit Map Type |
| --- | --- |
| 1920 × 1080 | 1600 × 960 |
| 1280 × 720 | 1280 × 720 |
| 854 × 480 | 800 × 480 |
| 720 × 480 | 720 × 480 |

In other words, in order to output the text data for the above-listed four resolution, for example, 720×480, 854×480, 1280×720 and 1920×1080, the above-listed four bit map data, for example, 1600×960, 1280×720, 800×480, and 720×480, corresponding to the four resolution must be stored in the memory 101, such that the image display device displays a predetermined image.

At this time, the bit map data has the data size corresponding to the value obtained by multiplying the number of dots according to the resolution by the number of colors supported.

In other words, if the resolution of 720×480 and the color of 16 bits are provided, the bit map data has the data size of 5,529,6 Kbits (720×480×16=5,529,6)

Therefore, the conventional image display device has to store the bit map data corresponding to the kinds of the resolution, in order to display the image according to each resolution, and the bit map data has a substantially large data size as the resolution is high.

Additionally, the bit map data in the conventional image display device is not compressed, thereby resulting in the occupation of a large memory space.

SUMMARY OF THE INVENTION

Accordingly, the present invention is directed to an image display device in a digital TV that substantially obviates one or more problems due to limitations and disadvantages of the related art.

An object of the present invention is to provide an image display device in a digital TV can convert text data according to variation of resolution and compress bit map data.

Another object of the present invention is to provide an image display device in a digital TV can be applied to text data of an HTML format.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an image display device in a digital TV including: a data processing part for executing bit map conversion, compression, restoration and format-conversion for text data, the text data being at least one among HTML data, DHTML data, XML data, SGML data and bit map data; a memory for storing the bit map data obtained according to the bit map conversion and compression in the data processing part and image data inputted from an arbitrary receiving part, the receiving part receiving one of digital image data and analog image data; an image outputting part for reading the image data from the memory; and a display processing part for mixing the image data read from the image outputting part and the bit map data converted in format from the data processing part.

According to the image display device of the present invention, the data processing part is comprised of: a bit map converter for determining whether the text data is the bit map data and converting the text data into the bit map data, based upon the determined result; a bit map compressor for compressing the bit map data by using a run-length compression coding; a bit map decompressor for reading the compressed bit map data from the memory to thereby restore the read data to its original bit map data; and a format converter for converting the format of the decompressed bit map data to correspond with display resolution. The bit map converter converts the text data into the bit map data, if it is determined that the text data is not the bit map data and bypasses the text data, if it is determined that the text is the bit map data. The format converter can adjust the resolution by integrating real number times to one of horizontal and vertical directions of the decompressed bit map data.

In another aspect of the present invention, there is provided a data processing device in a digital TV which includes: a bit map converter for determining whether text data is bit map data and converting the text data into the bit map data, based upon the determined result; a bit map compressor for compressing the bit map data by using a predetermined compression coding; a bit map decompressor for reading the compressed bit map data from a memory to thereby restore the read data to its original bit map data; and a format converter for converting the format of the decompressed bit map data to correspond with display resolution.

In still another aspect of the present invention, there is provided a data processing device in a digital TV which includes: a bit map converter for determining whether text data is bit map data and converting the text data into the bit map data, based upon the determined result; a format converter for converting the bit map data to correspond with display resolution; a bit map compressor for compressing the bit map data by using a predetermined compression coding; and a bit map decompressor for reading the compressed bit map data from a memory to thereby restore the read data to its original bit map data.

With the image display device of the present invention, the text data is converted such that it can correspond with various resolution, the text data is compressed such that a memory space can be substantially decreased, and the support for the text data of document formats such as HTML, DHTML, XML and SGML is provided such that various image shapes can be displayed.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
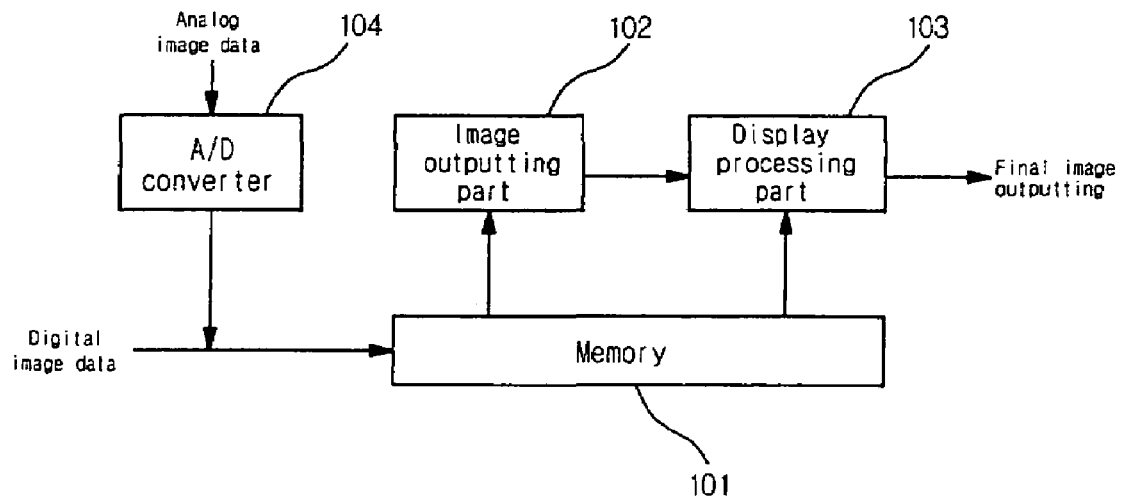
FIG. 1 is a block diagram illustrating a conventional image display device in a digital TV.
Figure 2:
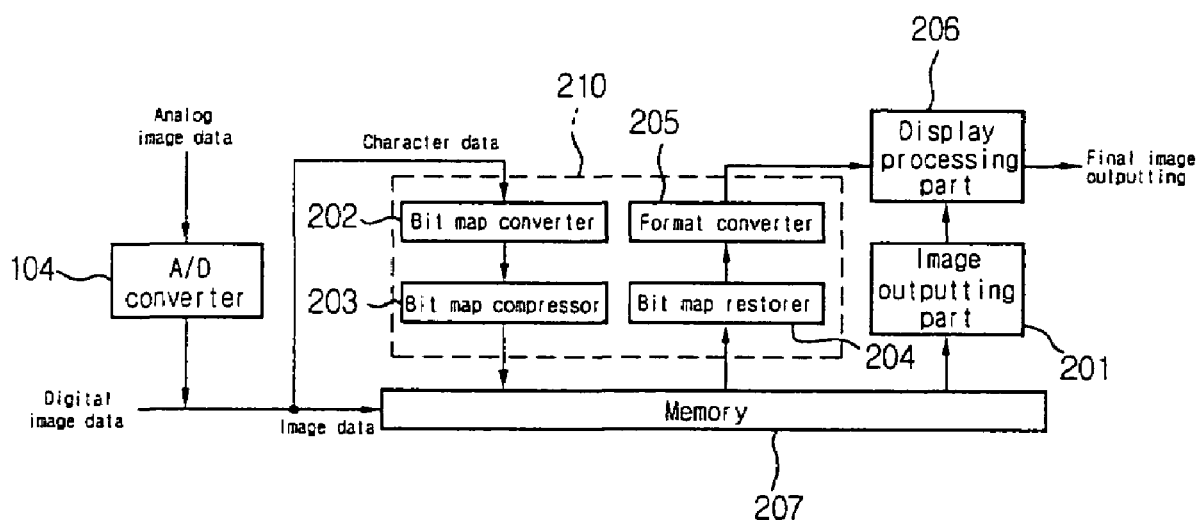
FIG. 2 is a block diagram illustrating an image display device in a digital TV according to an embodiment of the present invention.

FIG. 2 is a block diagram illustrating an image display device in a digital TV according to an embodiment of the present invention.

As shown, the image display device of the present invention includes a data processing part 210, a memory 207, an image outputting part 201 and a display processing part 206.

Generally, the image display device receives audio data, video data (that is, image data) and various kinds of text data through a receiving part (which is not shown) and converts each of the received data into bit map data to store in the memory 207.

Under an assumption that after the image data is converted into the bit map data it is stored in the memory 207, an explanation of the processing for the text data will be in detail described.

The image data is converted into the bit map data by means of a bit map converter for image data conversion (which is omitted) and is then stored in the memory 207.

The data processing part 210 is provided for executing bit map conversion, compression, restoration and format-conversion for the text data and includes a bit map converter 202, a bit map compressor 203, a bit map decompressor 204 and a format converter 205.

The bit map converter 202 determines whether the text data is the bit map data and converts the text data into the bit map data, based upon the determined result.

The text data includes at least one among HTML data, DHTML data, XML data, SGML data and bit map data.

In this case, the conversion of the text data can be made by using one of first bit map data and second bit map data.

At this time, the first bit map data and the second bit map data are previously stored in a predetermined space of the memory, and an explanation of them will be in detail disclosed hereinafter.

The bit map data converter 202 bypasses the text data, if the text data is the bit map data.

In this case, since the text data exists as the bit map data, there is no need for an additional process of converting the text data into the bit map data.

Therefore, in case where electronic program guide (EGP) or data broadcasting service becomes commercialized in the future, there is no need for the determination for the text data inputted to the bit map converter 202, such that development for various kinds of softwares will be easily achieved, thereby providing a substantially wide range of image.

The bit map compressor 203 executes the compression for the bit map data outputted from the bit map converter 202 by using a predetermined compression coding.

Preferably, in this case, the compression coding adopts run-length coding.

The run-length coding indicates the block of pixels run as single data and the number of run times of the data, which can compress original data at its maximum, thereby substantially reducing the space where the data is stored.

For example, the data to be compressed exists as follows: 730000000

In this case, the above data is compressed as follows: 730n7

Therefore, data of 9 bytes can be compressed to data of 5 bytes, and the larger the data to be compressed is in size, the higher the effect of the compression is.

On the other hand, the bit map data compressed from the bit map compressor 203 is inputted to the memory 207 and then stored therein.

The bit map decompressor 204 reads the compressed bit map data from the memory 207 and restores the read data to its original bit map data.

In this case, the compressed data is decompressed to the original bit map data by inversion-converting the run-length compression coding that is used when the bit map data is compressed.

The format converter 205 executes the format conversion for the bit map data decompressed from the bit map decompressor 204, such that the bit map data corresponds to the display resolution.

The format conversion can be adjusted by integrating real number times to one of horizontal and vertical directions of the decompressed bit map data.

Since the format converter 205 does not exist in the conventional device, a plurality of bit map data corresponding to the various resolution should be stored and set in the memory 207. This causes the memory space occupied by the bit map data to be excessively increased.

According to the present invention, therefore, the format conversion of the format converter 205 can display various resolution with a few number of bit map data, and the memory space occupied by the bit map data can be considerably reduced.

On the other hand, the memory 207 stores the bit map data outputted from the bit map converter 202 and the bit map compressor 203 and the image data inputted from the arbitrary receiving part (which is not shown).

As described above, the image data has been converted into the bit map data.

In this case, the receiving part can receive one of digital image data and analog image data.

The analog image data can be converted into the digital image data by means of an analog/digital converter 104.

The memory 207 stores the bit map data used in the bit map converter 202.

In this case, the bit map data includes first bit map data of 720×480 and second bit map data of 960×540.

The image outputting part 201 reads the image data stored in the memory 207, for the purpose of displaying the image data.

At this time, the image data may take the shape of the bit map data.

The display processing part 206 mixes the image data outputted from the image outputting part 201 and the bit map data outputted from the format converter 205.

The positions and colors of the image data and the text data to be displayed on the screen are adjusted by means of the display processing part 206.

As the image data and the bit map data are synthesized by virtue of the display processing part 206, the image and text are simultaneously outputted in accordance with the resolution corresponding to the display screen.

A method of mixing the image data and the bit map data in the display processing part 206 is well known, and an explanation of it will be excluded in this detailed description for the sake of brevity.

First, the digital TV receives the image data and the text data, respectively, decodes them and stores the decoded image data in the memory 207.

By the way, the text data is stored in the memory 207 via the bit map converter 202 and the bit map compressor 203.

In case where the text data is inputted by an operator at the time when the digital TV is produced, however, only the text data is inputted to the bit map converter 202.

Also, the digital TV receives the analog image data through the arbitrary receiving part and converts the received analog image data into the digital image data by means of the analog/digital converter 104.

So, the bit map converter 202 determines whether the text data is the bit map data.

In other words, if it is determined that the text data is not the bit map data, the bit map converter 202 converts the text data into the bit map data, using one of the first bit map data and the second bit map data stored in the memory 207.

If it is determined that the text data is the bit map data, however, the bit map converter 202 bypasses the text data.

If various text data are supported in the digital TV, therefore, the digital broadcasting can support the data broadcasting in the future, and a variety of user interfaces can be provided by the various text data.

The bit map data converted by the bit map converter 202 is inputted to the bit map compressor 203, in which the bit map data is compressed.

Preferably, in this case, the compression of the bit map data is carried out by using the run-length compression coding.

The bit map data compressed from the bit map compressor 203 is inputted to the memory 207 and then stored therein.

The bit map decompressor 204 reads the compressed bit map data from the memory 207 and restores the read data to its original bit map data.

In this case, the decompressed bit map data is converted in format by means of the format converter 205, such that the bit map data corresponds to the predetermined display resolution.

The format conversion of the format converter 205 can be adjusted by integrating real number times to one of horizontal and vertical directions of the decompressed bit map data.

An example of the format conversion of the format converter 205 according to the various resolution is given by the following Table <1>.

Table <1> shows an example of the image obtained in the following four resolution by using two bit map data in the digital TV.

| Display Resolution | First Bit Map Data (720 × 480, H × 1 : V × 1) | Second Bit Map Data (960 × 540) |
| --- | --- | --- |
| 1920 × 1080 | 1920 × 1080 (H × 2.67 : V × 2.25) | 1920 × 1080 (H × 2 : V × 2) |
| 1280 × 720 | 1280 × 720 (H × 1.78 : V × 1.5) | 1280 × 720 (H × 2 : V × 2) |
| 854 × 480 | 854 × 480 (H × 1.19 : V × 1) | 854 × 480 (H × 0.89 : V × 0.89) |
| 720 × 480 | 720 × 480 (H × 1 : V × 1) | 720 × 480 (H × 0.75 : V × 0.89) |

Wherein, the 'H×1:V×1' represents the ratio of the horizontal direction to the vertical direction of the bit map data, and for example, 720×480 of the first bit map data has the ratio of H:V of 1:1.

In order to output the text data corresponding to the four resolution of 720×480, 854×480, 1280×720 and 1920×1080 on the screen, the first bit map data of 720×480 and the second bit map data of 960×540 are stored in the memory 207.

As apparent from Table <1>, the resolution corresponding to the four resolution, respectively can be obtained by using the single first bit map data.

At this time, in case of the display resolution of 720×480, the first bit map data of 720×480 (H×1:V×1) is directly used, and in case of the display resolution of 854×480, the first bit map data of 854×480 (H×1.19:V×1) having the horizontal direction increased by 1.19 times is used.

Also, in case of the display resolution of 1280×720, the first bit map data of 1280×720 (H×1.78:V×1.5) having the horizontal direction increased by 1.78 times and the vertical direction increased by 1.5 times is used, and in case of the display resolution of 1920×1080, the first bit map data of 1920×1080 (H×2.67:V×2.25) having the horizontal direction increased by 2.67 times and the vertical direction increased by 2.25 times is used.

It can be, therefore, apparent from Table 1 that in the same manner as the first bit map data, the conversion into the four resolution in the digital TV can be made by using the single second bit map data.

Therefore, the bit map data can be converted by the format converter 205 by using one of the first and second bit map data stored in the memory 207, to thereby correspond with each resolution.

On the other hand, the image outputting part 201 reads the image data from the memory 207.

Then, the display processing part 206 mixes the image data and the bit map data, thereby outputting the mixed data on a predetermined display screen.

If the format converter 207 is disposed between the bit map converter 202 and the bit map compressor 203, the image display device can execute the same operation as in FIG. 2 or execute a more excellent operation than that in FIG. 2. An explanation of it will be described with reference to FIG. 3.

Figure 3:
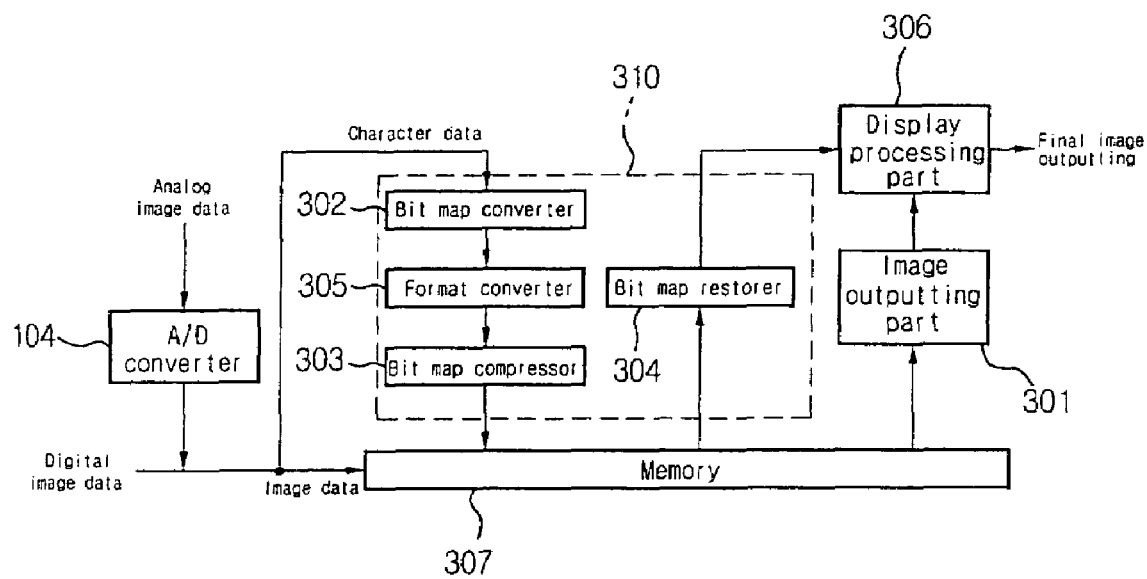
FIG. 3 is a block diagram illustrating an image display device in a digital TV according to another embodiment of the present invention.

Functions of each part in FIG. 3 are the same as in FIG. 2, and therefore, the operation process thereof will be described.

FIG. 3 is a block diagram illustrating an image display device in a digital TV according to another embodiment of the present invention.

Referring to FIG. 3, the text data is converted into the bit map data by virtue of the bit map converter 302, and then, the bit map data is converted in format to correspond with the resolution outputted on the screen, by means of the format converter 305.

In this case, the conversion into the bit map data is carried out by using one of the first bit map data and the second bit map data previously stored in the memory 307, and the conversion in format is carried out by integrating real number times to one of horizontal and vertical directions of the bit map data selected, such that the bit map data is adjusted in size to correspond with the resolution on the screen.

The bit map data converted in format by the format converter 305 is compressed by means of the bit map compressor 303 and then stored in the memory 307.

At this time, the memory 307, stores set bit map data (i.e., at least one of the first bit map data and the second bit map data) to be converted in the bit map converter 302, in addition to the bit map data.

The image data from the memory 307 is read by the image processing part 301, and the bit map data is decompressed to its original data by the bit map compressor 303.

Then, the image data and the decompressed bit map data are inputted to the display processing part 306 and displayed as a final image output on the screen.

Figure 4:
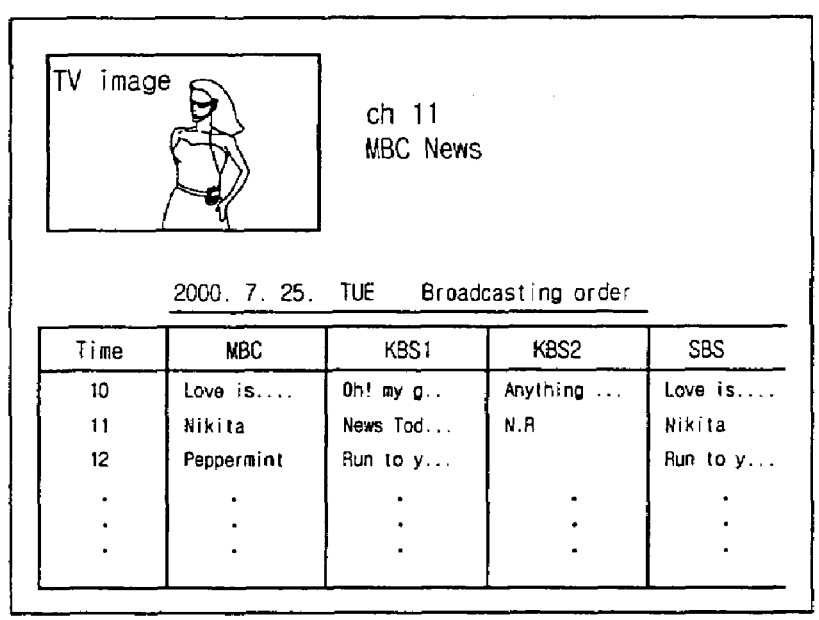
FIG. 4 is an exemplary view illustrating the display screen embodied by the image display device of the present invention.

FIG. 4 is an exemplary view illustrating the display screen embodied by the image display device of the present invention.

Referring to FIG. 4, the image corresponding to the channel selected by a user is displayed on the one side of the upper portion of the display screen of the digital TV, and texts according to the text data are outputted around the image.

In this case, on the right side of the image the channel now showing and the name of program are outputted, and on the lower portion of the display screen the broadcasting order of the day is outputted.

At this time, if various setting contents of the digital TV are to be changed, a setting list is outputted on the upper portion of the screen by an input means from the user.

Therefore, the image display device of the digital TV can display considerably various kinds of information on the display screen.

As described above, an image display device in a digital TV according to the present invention can convert text data in such a manner as to correspond with various resolution outputted on the screen of the digital TV.

Moreover, the image display device of the present invention can be applied to text data of an HTML format, such that the image is embodied by the text data of various shapes. This will enable an EPG service and data broadcasting to be further developed.

In addition, the image display device of the present invention can carry out the compression for bit map data, thereby reducing the memory space.

Also, the image display device of the present invention can support the HTML format, such that the text data is developed by the HTML format. Therefore, the text data can be designed independently of CPU and OS.

The forgoing embodiments are merely exemplary and are not to be construed as limiting the present invention. The present teachings can be readily applied to other types of devices. The description of the present invention is intended to be illustrative, and not to limit the scope of the claims. Many alternatives, modifications, and variations will be apparent to those skilled in the art.

What is claimed is:

1. A data processing device in a digital TV having a display that has a plurality of different display resolution for displaying image data and text data according to a variation of the display resolution, comprising:
   a bit map converter for determining whether text data received by the digital TV is bit map data and converting the text data into the bit map data, based upon the determined result;
   a bit map compressor for compressing the bit map data by using a predetermined compression coding;
   a bit map restorer for reading the compressed bit map data from a memory to thereby restore the read data to its original bit map data; and
   a format converter for converting the format of the restored bit map data to correspond with any of the plurality of different display resolutions.

2. The device as defined in claim 1, wherein the text data being at least one among HTML data, DHTML data, XML data, SGML data and bit map data.

3. The device as defined in claim 1, wherein said bit map converter converts the text data into the bit map data, if it is determined that the text data is not the bit map data.

4. The device as defined in claim 1, wherein said bit map converter bypasses the text data, if it is determined that the text data is the bit map data.

5. The device as defined in claim 1, wherein said predetermined compression coding is a run-length compression coding.

6. The device as defined in claim 1, wherein the conversion of the text data is memory.

7. The device as defined in claim 1, wherein said format converter adjusts the resolution by integrating real number times by one of horizontal and vertical directions of the restored bit map data.

8. A data processing device in a digital TV having a display that has a plurality of different display resolution for displaying image data and text data according to a variation of the display resolution, comprising:
   a bit map converter for determining whether text data to be displayed on the digital TV display is bit map data and converting the text data into the bit map data, based upon the determined result;
   a format converter for converting the format of decompressed bit map data to correspond with any of the plurality of different display resolutions;
   a bit map compressor for compressing the bit map data by using a predetermined compression coding; and
   a bit map restorer for reading the compressed bit map data from a memory for restoring the read data to its original bit map data.

9. The device as defined in claim 8, wherein the conversion of the text data is carried out by using either first bit map data or second bit map data previously stored in said memory.

10. The device as defined in claim 8, wherein said format converter adjusts the resolution by integrating real number times to one of horizontal and vertical directions of the restored bit map data.

11. The device as claimed in claim 1, wherein the plurality of different display resolutions comprise 720×480, 854×480, 1280×720 and 1920×1080.

12. The device as claimed in claim 6, wherein the stored first bit map data has a resolution of 720×480 and the stored second bit map data has a resolution of 960×540.

13. The device as claimed in claim 1, wherein the display resolution to which the format is converted is a predetermined format.

14. The device as claimed in claim 8, wherein the display resolution to which the format is converted is a predetermined format.

* * * * *